United States Patent
Karobath et al.

[11] 3,891,463
[45] June 24, 1975

[54] LEAK-PROOF GALVANIC CELL

[75] Inventors: Ernst Karobath; Leopold Rippel, both of Vienna, Austria

[73] Assignee: Telephon-und Telegraphen-Fabriks Aktiengesellschaft Kapsch & Sohne In Wien, Vienna, Austria

[22] Filed: Dec. 19, 1973

[21] Appl. No.: 426,239

[30] Foreign Application Priority Data
Dec. 21, 1972  Germany............................ 2262670

[52] U.S. Cl.............................. 136/134 R; 136/133
[51] Int. Cl. ............................................ H01m 1/02
[58] Field of Search..................... 136/133, 134, 177

[56] References Cited
UNITED STATES PATENTS

| | | | |
|---|---|---|---|
| 3,184,341 | 5/1965 | Reilly.............................. | 136/177 X |
| 3,278,339 | 10/1966 | Reilly et al..................... | 136/177 X |
| 3,301,713 | 1/1967 | Lozeau............................ | 136/177 |
| 3,420,714 | 1/1969 | Knight............................ | 136/133 X |
| 3,615,863 | 10/1971 | Pun................................ | 136/133 X |

Primary Examiner—Winston A. Douglas
Assistant Examiner—John F. Niebling
Attorney, Agent, or Firm—Waters, Schwartz & Nissen

[57] ABSTRACT

A leak-proof galvanic cell comprising a plastic sleeve having a cover with an opening and a flange surrounding an inserted positive bar electrode. A sealing material is provided in the annular gap between the flange and the bar electrode and it is constituted of elastomeric atactic polypropylene having a softening range above 100° C. The sealing material can additionally contain from 5 to 30% of microcrystalline wax.

2 Claims, 1 Drawing Figure

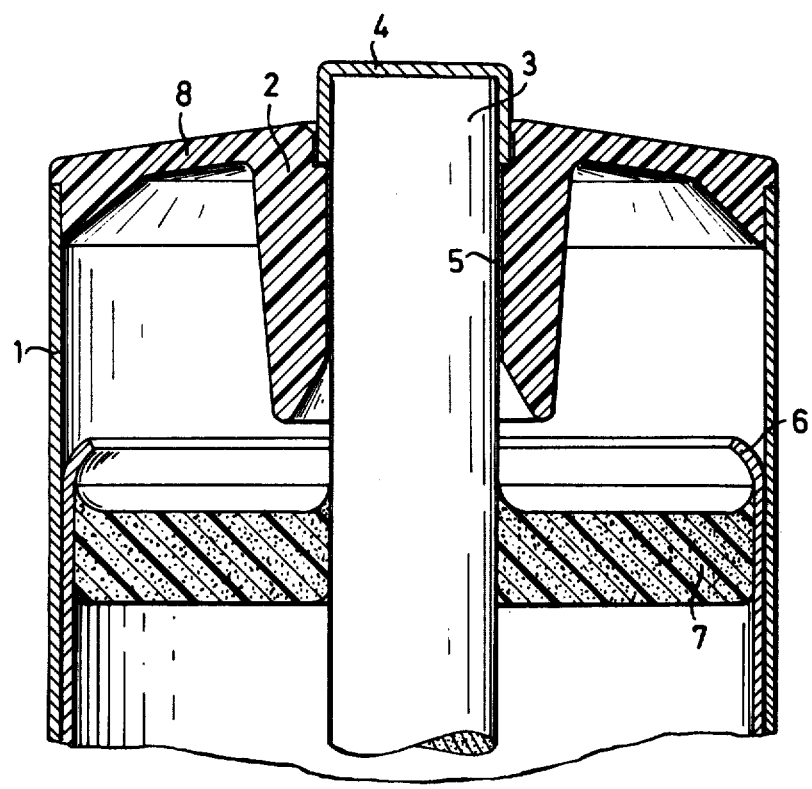

LEAK-PROOF GALVANIC CELL

The invention relates to a leak-proof galvanic cell having a plastic casing sleeve, the cover of which has a flange-like aperture means for the positive bar electrode, while a sealing material is disposed in the annular gap between the flange on the cover and the electrode.

Leak-proof galvanic cells of this kind differ from the generally conventional construction of galvanic cells with a plastic sleeve enclosure, by the provision of a separate sealing material in the annular gap between the flange on the cover and the positive electrode. It is only conventional for the positive electrode to be impregnated with oil or wax, the electrode being secured in place by purely mechanical means. With this arrangement it is necessary for the bore in the flange to be smaller than the diameter of the positive electrode which is usually in the form of a carbon rod, so that the flange sits against the carbon rod with a kind of press fit. In practice however the cell is not completely reliably sealed, for the following reasons:

Firstly, it must be accepted that the carbon rod is never completely round. There is always the possibility of splintering occuring, and this provides a passage for the discharge of fluid from the cell, even when the sealing flange is a very firm fit against the carbon rod. The carbon rod is generally impregnated with oil or wax in order to prevent fluid being passed through the porosity of the carbon material. However, splintering in the carbon rod cannot be compensated for by the oil or wax impregnation.

Apart from defects in the material and in production of the cell, the surface of the carbon rod used is not very smooth so that small capillary passages remain on the graphite rod, even when the plastic neck portion or flange is a tight press fit thereon, and electrolyte can escape outwardly from the interior of the cell through the very small capillary passages, especially as the degree of wetting of the surface of a body increases with the roughness of that surface. This can be to such an extent that wetting occurs even if the surface tension of the solution is greater than the critical surface tension of the solid body. Impregnating the carbon rod with oil or paraffin also has no effect in this respect.

If on the other hand, in order to provide a suitably firm fit between the flange on the cover and the bar electrode, for example the diameter of the flange is made 0.1 to 0.2 mm smaller than the diameter of the carbon rod, there is the danger of two defects occuring in production:

A greater force is required to press the sleeve with the sealing flange at its top end, onto the cell casing. This increased force puts a severe loading on the strength of the positive electrode rod, particularly when the rod does not fit precisely centrally into the bore in the sleeve cover. For compensating such eccentricity, it has already been proposed that the cover should be weakened in an annular configuration. Nonetheless, the positive electrode rod can suffer breakage when the sleeve with cover is being fitted onto the cell. In addition, if the carbon rod withstands this severe loading, the pressing force applied to it is transmitted into the interior of the cell by way of the carbon rod, as the cell can only be supported at the bottom of the cell casing when the external plastic sleeve is being pressed into position. This means however that damage can easily occur in the interior of the cell structure.

Finally, there is a further difficulty which lies in the nature of the plastic material. If the above-mentioned large difference between the two diameters, namely from 0.1 to 0.2 mm is used, in order to provide a suitably firm fit on the carbon rod, the injection-moulded flange is expanded by the carbon rod and severe forces occur in the plastic material, which act radially in the bore in the cover. Stresses in plastic material however are always dangerous. This is because on the one hand the plastic material yields to these stresses in the course of time, so that the sealing action is lost, and also there is the danger of stress corrosion which leads to cracks appearing in the plastic material.

In order to overcome the above-mentioned disadvantages, it has already been proposed (cf. DL Pat. No. 62 598) that the sealing material in the annular gap between the flange on the cover and the electrode should be in the form of a wax layer. When such a sealing ring is used, it is possible for the difference between the diameters of the flange and the electrode rod to be made substantially smaller, approximately of the order of magnitude of 0.1 mm. This ensures that the sleeve with the flange can be pushed onto the cell by applying only a small force, thereby preventing damage to the galvanic cell and the sleeve.

Quite surprisingly however, in cells which were sealed as described above, it was found that electrolyte fluid was occasionally discharged from the cell, which at first was difficult to explain. It has now been found that the reason for this breakdown lies in two quite different properties of the sealing material. Firstly, one factor that was previously overlooked was that, for example, when a short circuit occurs in the cell, according to the particular cooling conditions of the battery container, temperatures of from 50° to 100°C can occur in the cell. Practical tests have shown that in such a case the wax which hitherto was used as the sealing material becomes fluid, and is driven out from the neck of the cell by the increased pressure prevailing in the interior of the cell due to the short circuit, whereupon electrolyte fluid subsequently escapes from the cell due to the unsealed passages which are opened in this way.

It has also been found that the connection between the wax and the carbon rod is in fact sufficiently strong, but that the connection between the wax and the flange on the cover is not, in order to resist the gas pressure which can occur under some circumstances in the interior of the cell. The reason for this was found to be that, when crystalline sealing material is used, there is not sufficient surface contact between the sealing material and the plastic material, and therefore there is not a sufficient adhesive force.

In accordance with the invention, it is therefore provided that the softening range of the sealing material which completely or predominantly comprises elastomeric, plastic, non-crystalline material, begins only above a temperature of 100°C.

As the beginning of the softening range is considered the so called softening point which is determined according to DIN 1995/U 4 (so called ring-sphere-method). This point has been chosen as a reference point because the materials in question have in general no clearly defined melting point.

The main advantage of the invention lies in the fact that it is no longer necessary to maintain a constant pressure between the carbon rod and the surrounding flange. The diameter of the carbon rod may now be equal to or even slightly smaller than the inner diameter of the surrounding flange.

In principle, sealing materials according to the invention can be considered to include, for example, one-component lacquers which are applied to the positive electrode rod in fluid condition and whose hardening times is such that they are fluid while the sleeve is being fitted to the cell and are solid before final inspection and delivery of the cell. Similarly, for two-component adhesives, the adhesive and hardener are only brought together at the point of use (positive electrode rod), so that they are fluid while the sleeve is being fitted onto the cell and harden shortly thereafter.

In particular however, polymers of isobutylene and in particular atactic polymers of propylene have been found to be particularly advantageous. This is particularly because the necessary adhesive forces occur between atactic polypropylene and the thermoplastic materials used as the material for the cover. Difficulties in application when using atactic polypropylene as the sealing material in the use, as described above, can be overcome by adding from 5 to 30% of a suitable microcrystalline wax.

The preference for the last-mentioned sealing material is also based, in particular, on technical reasons from the point of view of the method of manufacture. Namely, account should be taken of the fact that the time available for the working operation of applying the sealing means is only of the order of magnitude of one second or less. Furthermore, applying the sealing material should not cause the cell itself and the production apparatus to be soiled, possibly by spray material. In particular however it is necessary that, after the production line has been stopped and then re-started again, for example, after overnight break, it should not be necessary to have to carry out extensive cleaning operations on the production apparatus, in order to remove therefrom the sealing material which may be contained in the devices to which it is supplied and which in the meantime has hardened. Atactic polypropylene alone only complies with the conditions as regards the sealing action at temperatures up to 100°C, but can only be applied with difficulty to the positive electrode rod within the short time available. By adding a suitable amount of microwax, it is however possible to provide that, on the one hand, the softening temperature still lies above 100°C, thus ensuring a good sealing action, and on the other hand the sealing material is easy to apply.

The invention is described in greater detail with reference to the sole FIGURE of the drawing which shows a portion of the cell in cross-section.

The zinc casing 6 of the battery is closed by a casting material 7 through which the carbon rod 3 passes. In order to prevent discharge from the cell, the zinc casing 6 is enclosed by a plastic sleeve casing 1 which is welded to the plastics cover 2. The carbon rod 3 which is provided with a metal contact member 4 is slightly larger in diameter than the diameter of the bore in the cover 2, the difference being approximately of the order of magnitude of 0.1 mm. The rod 3 is centered in the cover 2 by the cover 2 being provided with an annular weakened zone 8. Before the battery is fitted into the plastic sleeve casing 1 or before the cover 2 is fitted in place thereon, the part of the carbon rod 3 which projects out of the cell is coated or sprayed with a sealing substance which completely or predominantly comprises elastomeric, plastic, non-crystalline material, so that when the cover is fitted into place, the sealing substance is distributed over the whole of the sealing surface 5 which is between the cover 2 and the carbon rod 3. After the cover 2 has been fitted in place, the contact member 4 is mounted on the carbon rod 3.

It has been found particularly advantageous to apply the sealing substance in the form of a narrow ring which is distributed over the entire sealing surface solely by the action of the pressure of the cover when the cover is fitted into place.

We claim:

1. A leak-proof galvanic cell comprising a plastic sleeve, a cover on said sleeve having an opening with a surrounding flange, a positive bar electrode disposed in said opening and defining an annular gap with said flange, a sealing material in said annular gap between the flange and the bar electrode, said sealing material consisting essentially of elastomeric atactic polypropylene having a softening range above a temperature of 100°C.

2. A leak-proof galvanic cell as claimed in claim 1 wherein the sealing material additionally contains from 5 to 30% of microcrystalline wax.

* * * * *